US006609281B2

(12) United States Patent
Morrison et al.

(10) Patent No.: US 6,609,281 B2
(45) Date of Patent: Aug. 26, 2003

(54) HAND TOOL FOR BRAKE SHOE SPRING-RETAINING CUP

(76) Inventors: John T. Morrison, 905 Echo Trail, Marengo, IL (US) 60152; Walter Russell Fitza, Jr., 307 N. Lakeside Dr., Durango, CO (US) 81303

( * ) Notice: Subject to any disclaimer, the term of this patent is extended or adjusted under 35 U.S.C. 154(b) by 0 days.

(21) Appl. No.: 09/947,172

(22) Filed: Sep. 4, 2001

(65) Prior Publication Data

US 2003/0041430 A1 Mar. 6, 2003

(51) Int. Cl.[7] .................................................. B23P 19/04
(52) U.S. Cl. ............................. 29/227; 29/278; 29/233; 81/124.2
(58) Field of Search .......................... 29/233, 278, 227, 29/270, 280; 81/124.2; 294/86.32; 279/43.2

(56) References Cited

U.S. PATENT DOCUMENTS

| | | | | |
|---|---|---|---|---|
| 798,325 | A | | 8/1905 | Daddysman |
| 952,570 | A | | 3/1910 | Lamb |
| 1,092,574 | A | | 4/1914 | Jannson |
| 1,220,100 | A | | 3/1917 | Haeseler |
| 1,321,776 | A | | 11/1919 | Stepanian |
| 1,336,794 | A | | 4/1920 | Stepanium |
| 1,462,293 | A | | 7/1923 | Mason |
| 1,801,577 | A | | 4/1931 | Stevens |
| 1,847,843 | A | | 3/1932 | McKeagan |
| 1,882,520 | A | | 10/1932 | Pollard |
| 1,989,278 | A | | 1/1935 | Allen |
| 2,154,651 | A | | 4/1939 | Wodack et al. |
| 2,422,549 | A | * | 6/1947 | Hogin ......................... 29/235 |
| 2,490,478 | A | | 12/1949 | Schaedler |
| 2,566,673 | A | | 9/1951 | Nygaard |
| 2,634,641 | A | | 4/1953 | Hodges |
| 2,701,491 | A | | 2/1955 | Ross |
| 2,909,090 | A | | 10/1959 | Moore |
| 2,956,462 | A | | 10/1960 | Paul |
| 3,151,512 | A | | 10/1964 | Charczenko |
| 3,590,235 | A | | 6/1971 | Leo et al. |
| 3,768,345 | A | | 10/1973 | Barnes |
| 3,837,244 | A | | 9/1974 | Schera et al. |
| 4,063,342 | A | | 12/1977 | Mitchell et al. |
| 5,191,690 | A | | 3/1993 | Koehn |
| 5,448,813 | A | | 9/1995 | Yassa |
| 5,615,587 | A | | 4/1997 | Foerster |
| 5,697,268 | A | * | 12/1997 | Makovsky ................... 81/125 |
| 5,836,429 | A | | 11/1998 | McGuire et al. |

* cited by examiner

*Primary Examiner*—Joseph J. Hail, III
*Assistant Examiner*—Daniel Shanley
(74) *Attorney, Agent, or Firm*—Maxwell C. Freudenberg; Kenton L. Freudenberg

(57) ABSTRACT

A hand tool having at least one end configured with several circumferentially spaced resilient detent fingers defining the periphery of a cage for capturing and both transversely and longitudinally positively confining the annular periphery of a spring-retaining cup of a brake shoe assembly of a vehicular drum brake. A captured cup is pressed by the tool against the end of a brake shoe positioning coil spring and the cup is rotated one quarter turn to attach or detach the cup relative to the end of a retaining pin which passes through the center of the cup and secures the cup, coil spring and brake shoe to a brake shoe supporting plate on the drum brake shoe assembly. The cup is retained in the tool when separated from the brake shoe assembly. The tool may be configured with multiple cages, such as a double ended tool. It may also be in the form of a socket tool having only one cage.

20 Claims, 6 Drawing Sheets

HAND TOOL FOR BRAKE SHOE SPRING-RETAINING CUP

FIELD OF THE INVENTION

This invention relates to a hand held tool to be used in servicing a conventional vehicular drum brake shoe assembly for capturing a spring-retaining annular disc-like cup and turning the cup relative to a coaxial retaining pin to enable release of a compressed coil spring which positions a brake shoe. When a cup is separated from the assembly to allow removal of a brake shoe, this invention enables a cup to be positively confined but releasably retained in the tool to prevent it from being misplaced or lost. A retained cup can be reinstalled during servicing of a brake shoe by mere manipulation of the tool.

BACKGROUND OF THE INVENTION

In one form of conventional vehicular drum brake shoe assembly a pair of brake shoes, located generally coaxially within a brake drum on opposite sides of the wheel axis, are held by compression springs against a relatively stationary flat brake shoe supporting plate extending transversely of the wheel axis. The compression springs bear against outer surfaces of flat web portions of the brake shoes. The springs are held in compression by nail-like pins having head portions removably held behind holes in the supporting plate. The pins extend outwardly from the supporting plate through holes in the respective brake shoe webs and through the compression springs and are releasably retained at the other ends of the pins in spring retaining cups.

Each cup has a flat annular flanged rim portion which is concentric with and overlies one end of the coil spring. A bowl portion of the cup fits within this end of the spring to keep the cup and the spring coaxial. At the center of the bowl portion of the cup is a transverse slot through which pass an enlarged flattened tip end of the nail-like pin. In the assembled arrangement of the brake shoe mechanism, the flattened tip of the pin lies in an elongated detent recess or groove extending transversely in the cup bowl. The cup may be removed by pressing it against the spring and rotating it ninety degrees or orthogonally to a position in which the tip may escape through the slot. Most cups are of two common diametrical sizes.

It has been a practice to remove cups for disassembly of the brake mechanism with a tool such as locking pliers, but upon removal of the cup it may be dropped or temporarily misplaced. This makes for inconvenience in handling the cups and also induces wasted time in reassembly unless the cup is kept in the relatively expensive locking pliers. Of course to keep each of the cups ready and easily locatable it would then also take two sets of such pliers to enable cup removal and assembly service on a pair of brake shoes. A problem of time consuming awkwardness exists in trying to simultaneously install a brake shoe, a retaining pin, a compression spring and a spring retaining cup.

SUMMARY OF THE INVENTION

The present single or double ended low cost resilient plastic tool has at each cup-engaging end several circumferentially spaced integrally molded or formed resilient detent fingers for positively engaging and grasping an annular peripheral edge of a coil-spring retaining cup in a drum brake shoe holding cup and retaining pin assembly. The tool has a body portion with at least three symmetrically arranged parallel fingers extending from the body portion parallel to an axis of the tool. During use this axis of tool rotation will be oriented perpendicular to the plane of the annular cup edge and aligned with the center of the cup. The tool is manually pushed axially relative to the cup with the detent fingers being forcibly transversely cammed and displaced outwardly during this axial movement of the tool as detent portions of the fingers are forced past the cup edge. The detent fingers provide means configured and arranged to be forcibly manually pushed past the cup edge at points spaced circumferentially around the cup edge whereby the tool provides a retaining cage for positively but releasably retaining the cup. The tool includes contact surface means for frictionally engaging the cup when the cup is in the cage to enable the cup to be rotated relative to the retaining pin when the tool is forcibly manually pushed axially and manually rotated about the tool axis to enable the cup to be positioned for detachment or attachment relative to the pin of the cup and pin assembly.

At least a symmetrically arranged plurality of the fingers at each cup capturing end of the tool are resilient and have portions projecting toward the tool axis to provide displaceable detent means engageable with the cup edge and displaceable relative to said axis by manually moving the tool axially to cam the detent means outwardly as they move over the cup edge for allowing the tool to positively grasp and hold the cup. This cage holds the cup during manipulation of the tool for detachment and attachment of the cup relative to the coaxial pin and retains the cup in said cage when the cup is separated from the pin.

The tool is preferably molded from a high strength durable light-weight resilient plastic. Its low cost enables it to be marketed as an included item in prepackaged sets of replacement brake shoes. Since one set of brake shoes requires only two retaining cups, a single double-ended tool enables a brake mechanic to keep both cups in the tool at all times when removed from the brake assembly while working on one wheel assembly.

A single double-ended tool of proper size will hold the two cups of a conventional brake shoe assembly for one wheel. A set of two tools will take care of the two most popular cup diameter sizes. Preferably each tool will have cup retaining cages of like diameters at its opposite ends, but if the ends of the tool are of different sizes two identical tools will suffice for one wheel.

An object of the invention is to provide a simple low cost small size cup removal tool which takes up minimal space in a tool box or chest.

Another object of the invention is to provide a cup removal tool which may be entirely or partially conspicuously coded by shape or color to enable it to be quickly identified in a tool box for the size of cups to be removed during a brake servicing job. Like sized ends on one tool may be coded alike and different sized ends on one tool may be differently coded.

Another object of the invention is to provide a low cost plastic tool which adds little weight to a tool box or may even be expendable so that it need not be carried at all times in a tool box.

DETAILED DESCRIPTION

Figure 1:
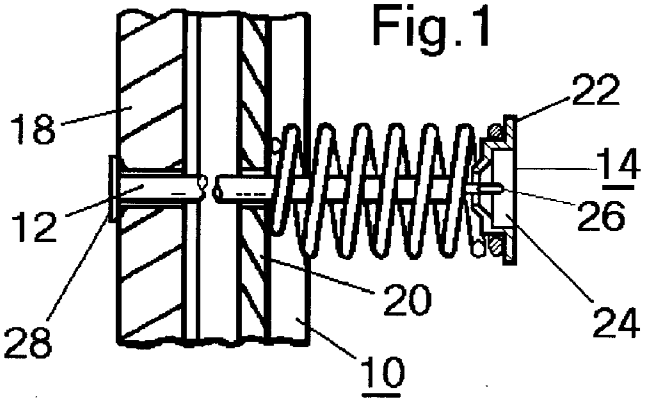
FIG. 1 is a view showing relationship of some components of a conventional prior art brake shoe assembly including a spring-retaining cup to be engaged by the tool of this invention.

FIG. 1 illustrates the significant parts of a conventional vehicular drum brake shoe assembly on which the tool of the present invention is used. One brake shoe 10 of a typical pair of brake shoes located generally coaxially within a brake drum (not shown) is held via nail-like retaining pin 12, spring-retaining cup or flat annular disc 14 and compression coil spring 16 against a relatively stationary flat brake shoe supporting plate structure 18. The spring 16 encircles the pin 12 between the outer surface of a web portion 20 of the shoe 10 and a flat annular flanged cup rim portion 22 which is concentric with and overlies one end of the coil spring 16. A bowl portion 24 of the cup fits within this end of the spring to keep the cup and the spring coaxial. At the center of the bowl portion of the cup is a transverse slot through which passes a transversely enlarged flattened tip end 26 of the nail-like pin 12. The pin has a head end 28 retained behind a hole in the shoe supporting structure 18. In the assembled arrangement of the brake shoe mechanism, the flattened tip 26 of the pin 12 is kept from being withdrawn through the cup slot by having the cup rotated ninety degrees or orthogonally from the position in which the tip passes through the slot whereby the flattened tip is retained in a conventional manner in an elongated detent recess extending in the cup bowl transversely of the slot passage.

Figure 2:
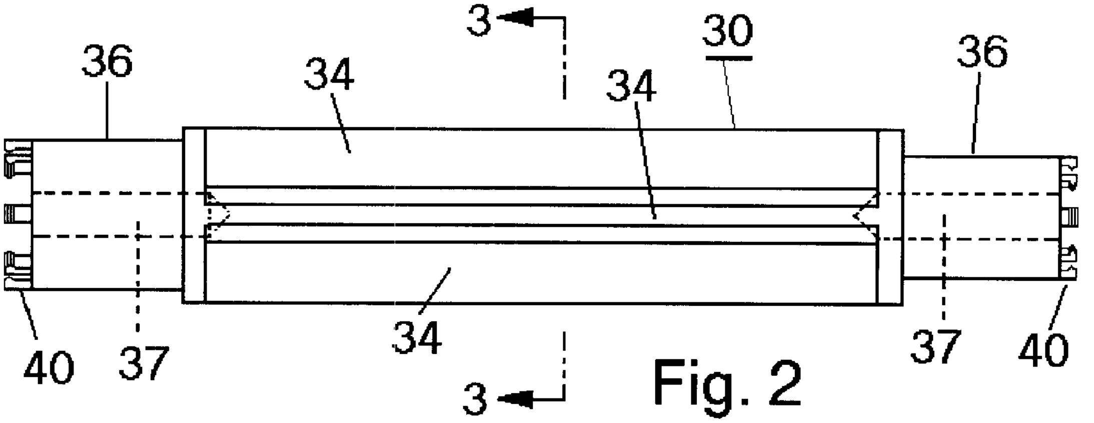
FIG. 2 is a side view of a preferred embodiment of the tool with tool ends for manipulating cups of different sizes.
Figure 3:
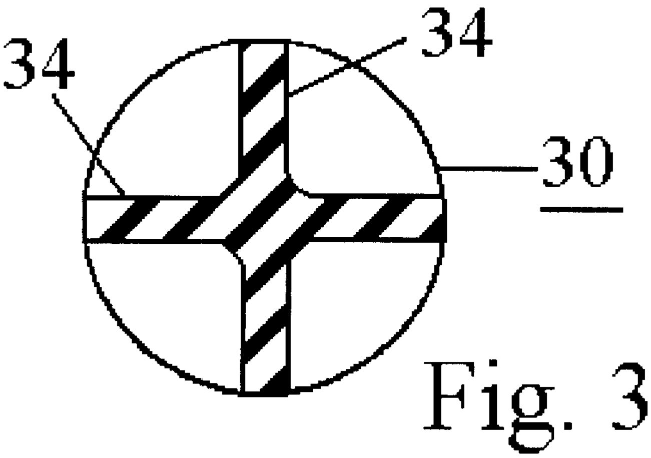
FIG. 3 is a tool body section on line 3—3 of FIG. 2.
Figure 4:
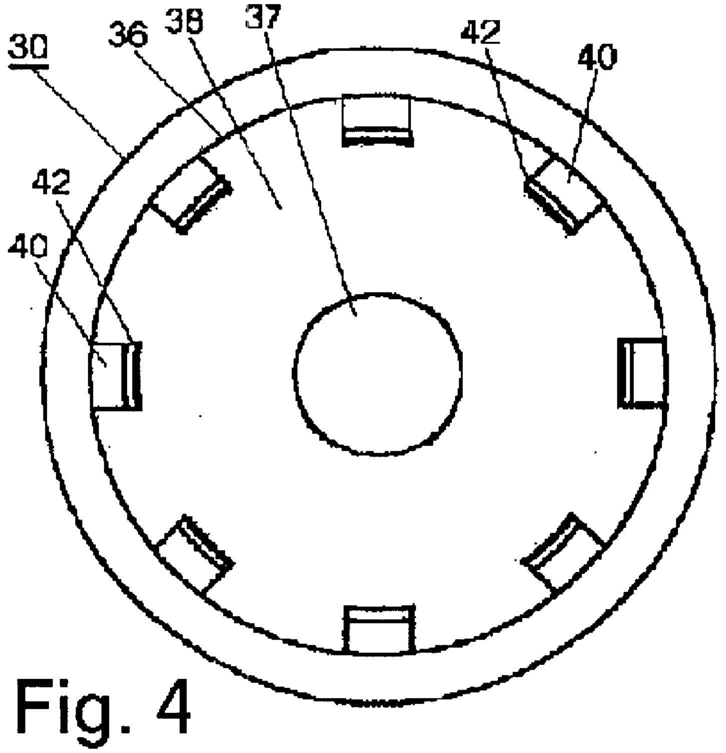
FIG. 4 is an left end view of FIG. 2.
Figure 5:
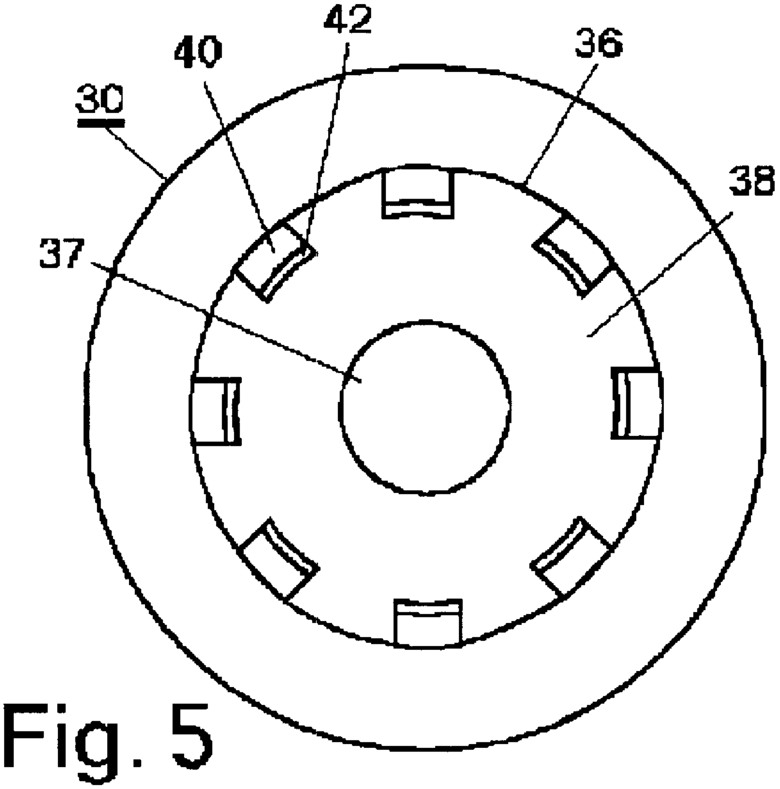
FIG. 5 is an right end view of FIG. 2.
Figure 6:
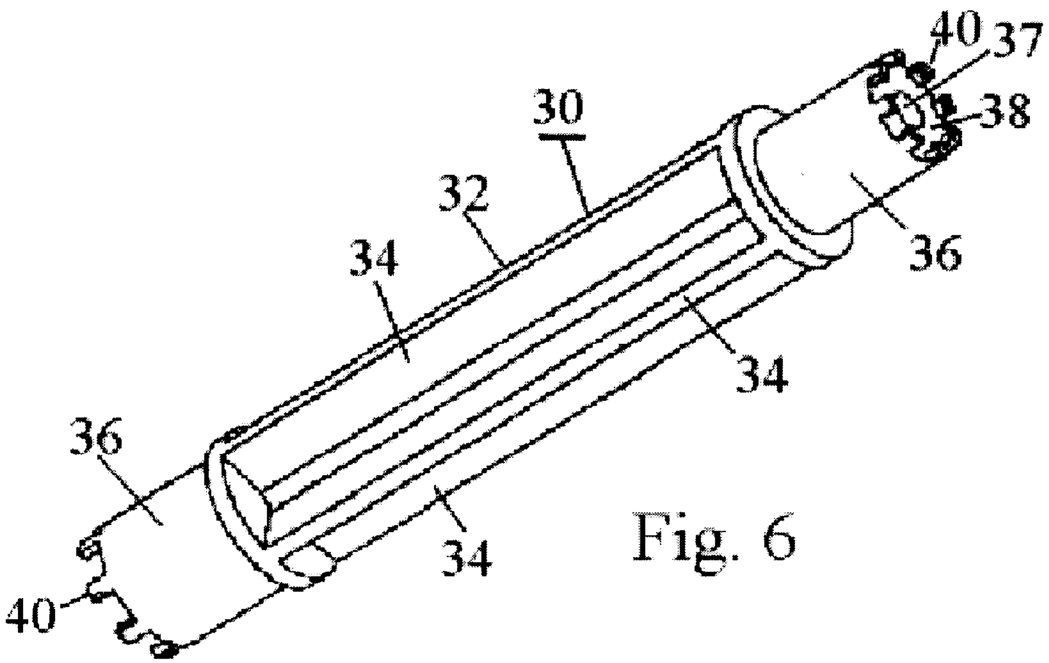
FIG. 6 is a perspective view of the tool of FIG. 2.
Figure 9:
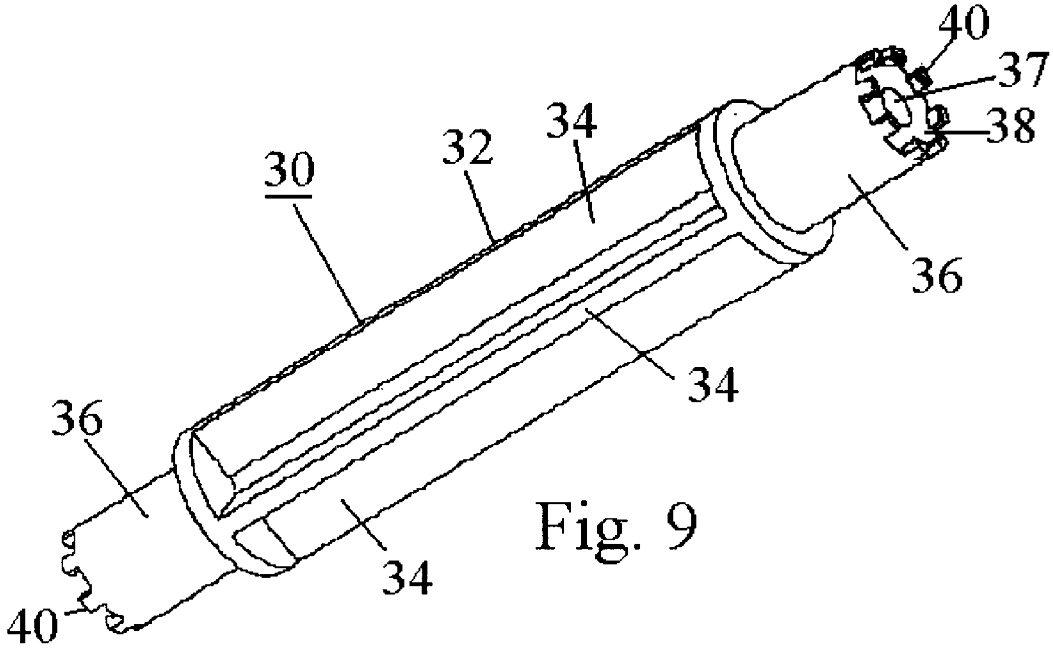
FIG. 9 is a perspective view of a tool like that of FIG. 6, but having identical opposite ends of the same size.
Figure 7:
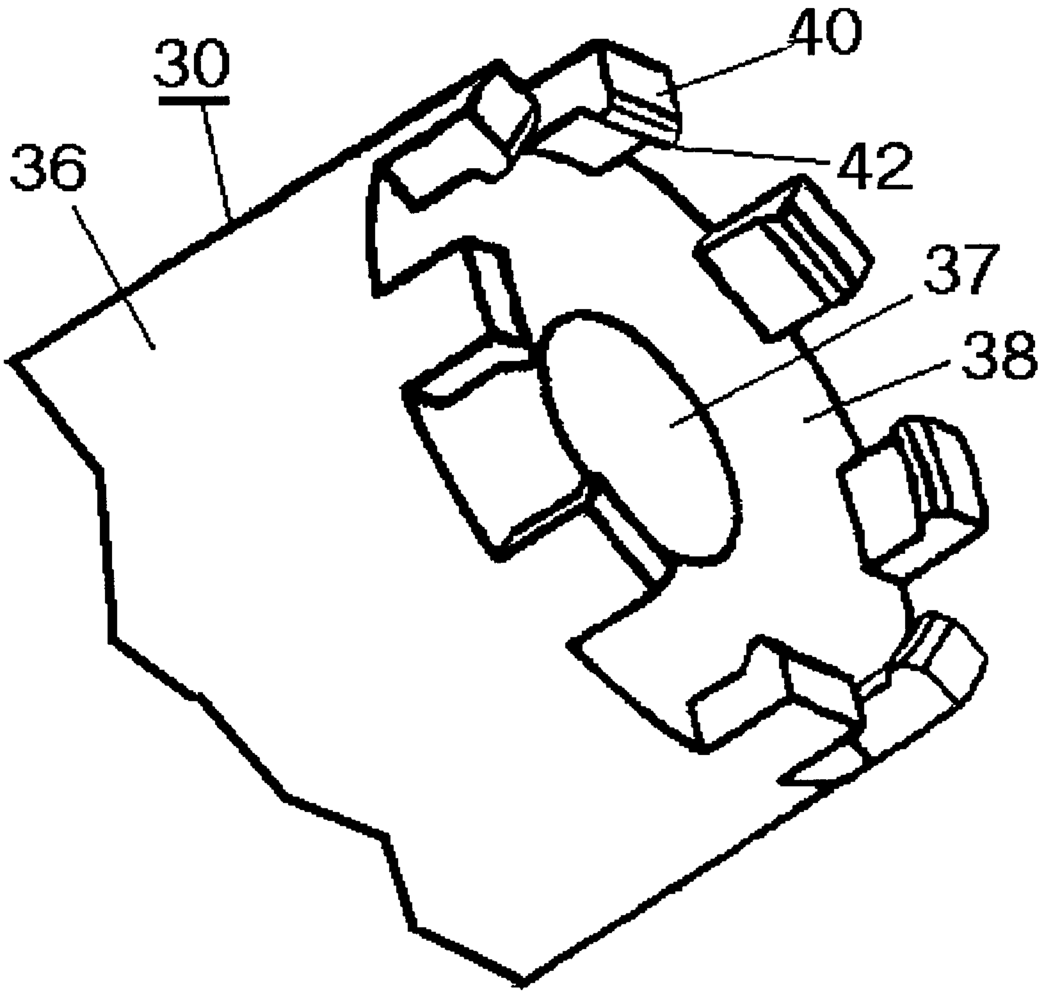
FIG. 7 is an enlarged perspective view of one end of the tool of FIG. 2.

As seen in FIG. 2 the tool 30 of this invention has a body portion 32 with an elongated central portion formed by four mutually perpendicular centrally connected radial vanes or webs 34. These several vanes enable tool weight reduction and conveniently provide means for manually gripping, turning and pushing or pulling the tool during a brake servicing job. Cylindrical end portions 36 of the tool 30 have flat exposed end faces 38 perpendicular to the axis of the tool for frictionally engaging the outer axially exposed surface of the cup flange 22 seen in FIG. 1. The tool end portions 36 have coaxial bores 37 which extend into the tool sufficient depths to accommodate or receive the tip ends 26 of pins 12 when the tool is used to grasp and press the cup 14 via end face 38 against the force of spring 16 and turn frictionally the cup to attach or release the cup 14 relative to pin 12.

Located on the tool end portions 36 are integrally formed or molded axially projecting short stubby resilient finger elements 40 uniformly spaced at and around the periphery of each end face 38.

Figure 8:
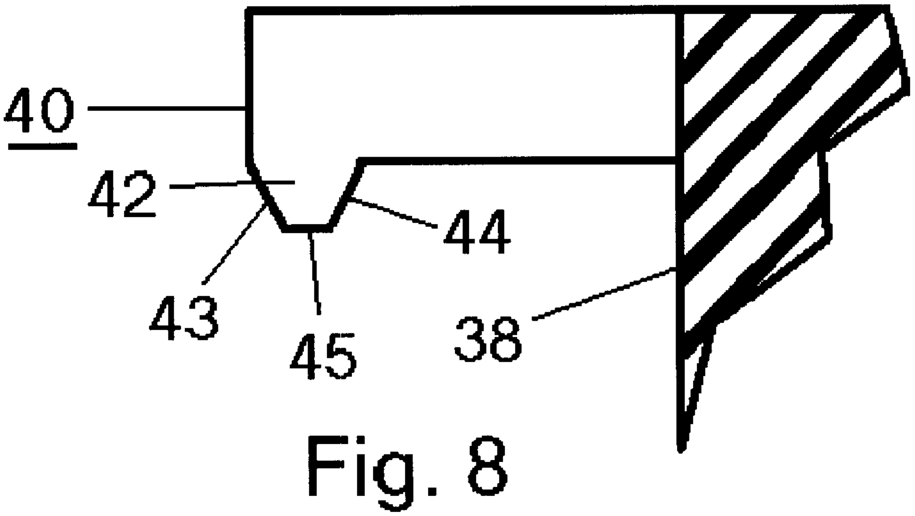
FIG. 8 is an enlarged view of the side of one cup-engaging finger element of the tool of FIG. 2 to better illustrate the detent structure at the outer end of the finger element.

The end face 38 and finger elements 40 form a retaining cage structure to hold and both longitudinally and transversely confine the cup The finger elements 40 provide detent means configured and arranged to be forcibly manually pushed past the cup edge at points spaced circumferentially around the cup edge whereby the tool provides in combination with a respective end face 38 a retaining cage for positively but releasably retaining the cup. The tool includes contact friction surface means made up of coplanar circumferentially or angularly spaced surface area portions of the face 38 which surround the bore 37. These surface area portion of face 38 frictionally engage the cup when the cup is in the cage to enable the cup 14 to be rotated relative to the retaining pin 12 when the tool is forcibly manually pushed axially and manually rotated about the coaxial axes of the tool, the bore 37, the pin 12, and the cup 14. Such rotation of the tool enables the cup to be positioned for detachment or attachment relative to the pin in the cup-and-pin assembly. 14. Outer surfaces of these fingers are merely longitudinal extensions of the cylindrical surfaces of the tool end portions 36. The exposed outer ends of the fingers 40 are coplanar in a plane perpendicular to the tool axis. Adjacent to and just inside the outer ends of the fingers 40 are radially inwardly extending and radially outwardly displaceable detent forming teeth elements 42 resiliently moveable by camming the fingers 40 outwardly as they are pushed or pulled past the peripheral edge of the cup rim 22 for capturing and holding or releasing a cup relative to the end face 38 of the tool. As seen in FIG. 8 the detent elements 40 have outer sloping camming surfaces 43 engagable with the peripheral edge of a cup to force the detent elements radially outwardly when the fingers 40 are pushed over a cup to grasp the cup. Similarly the detent elements have inner sloping camming surfaces 44 engagable with the peripheral edge of a cup to force the detent elements radially outwardly when the the intermediate surface portions 45 of the detents on fingers 40 are pulled over the cup to release the cup. These sets of sloping camming surfaces 43 and 44 lie in two frusto-conical coaxial axially spaced radially inwardly convergent loci configurations. The inner surfaces of the fingers 40 between the detents 42 and the end faces 38 are portions of a coaxial cylindrical configuration of smaller diameter than the outer cylindrical surface of the respective end portions 36 of the tool and just slightly larger diameter than the diameter of the cup edge. The axial distance between the end faces 38 and the detents on the fingers 40 is such as to provide a depth of the spring-retaining cage which prevents a cup retained therein from significantly tilting therein. The inner surfaces of the detents 42 between the chamfered or beveled surfaces 43 and 44 are portions of a coaxial cylindrical configuration of smaller diameter than the diameter of the cup edge. The side faces of each of the fingers 40 may be parallel or may inwardly converge as best suits the desires of the maker of a molding die for the tool. Similarly the adjacent faces of each two successive fingers may be parallel if the tool is to be created by a milling operation. Preferably there are eight similar symmetrically arranged fingers at each end of the tool so that breaking of some fingers is not likely to significantly affect the cup-grasping and cup-retaining capability of the tool. The width of the spaces between the detent fingers is greater than the width of the fingers so that a pointed tool such as an awl or a small screwdriver can be inserted between any two adjacent fingers and under the rim of a cup detached from the brake assembly to pry the cup out of the retaining cage of the tool 30.

Inwardly extending detent teeth 42 project a sufficient distance to grasp and hold the cup flange rim but also allow the fingers to provide means to flex outwardly to allow the inclined or sloping surfaces the detent teeth elements 42 to be cammed outwardly and slide past the cup rim during application or removal of the tool relative to the cup.

The depth of the cage area between the detent teeth 42 and the flat end surface 38 is shallow enough to prevent any significant tipping of a loose cup held in the cage area. This will keep the central slot opening in the bowl 24 of the cup 14 oriented to remain most accessible to entry of the tip of the retaining pin 12 through the cup 14 and thereafter into the axial bore passages 37 in the cylindrical end portions 36 of the tool.

Figure 10:
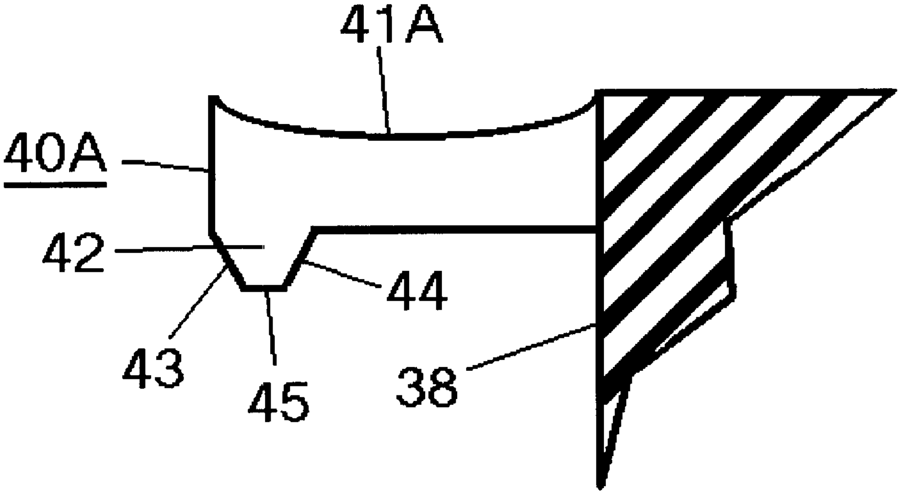
FIGS. 10 and 11 are enlarged views similar to FIG. 8 of two alternative embodiments of tools having a different thickness configurations of the finger elements to control bending.
Figure 11:
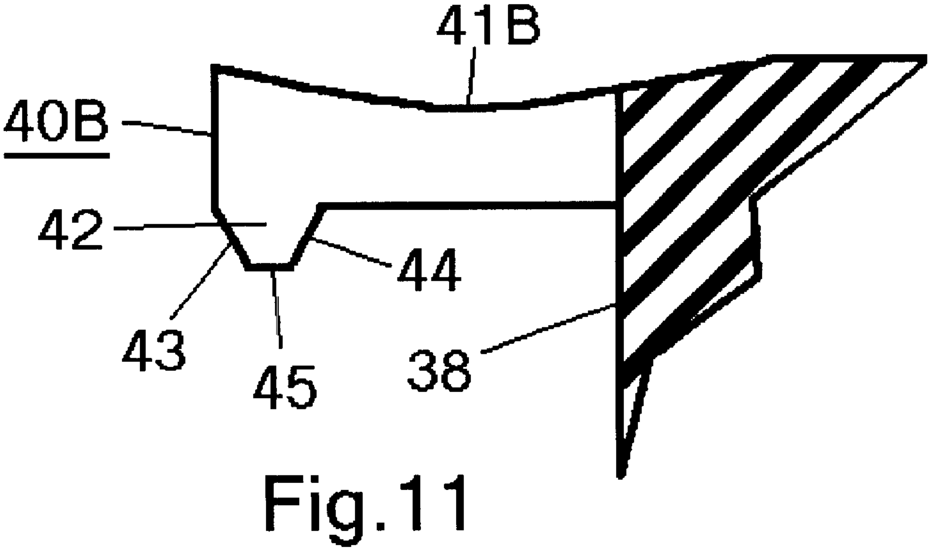
Figure 13:
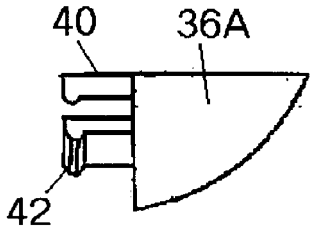
FIG. 13 is an enlarged view of the portion of FIG. 12 in the dotted circle A.
Figure 12:
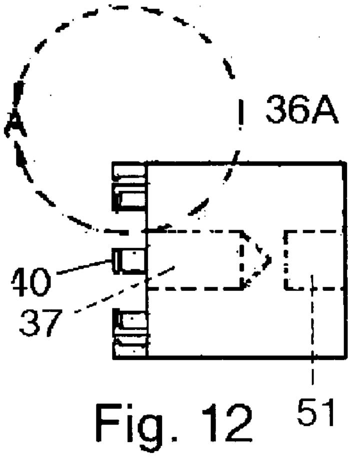
FIG. 12 is a side view of an alternative short socket-type tool embodiment in which one end of the tool is like one end of the embodiment of FIG. 2 and the other end is configured with a square axial opening to receive a male drive member of a conventional socket wrench.
Figure 14:
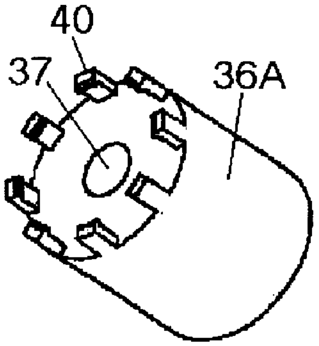
FIGS. 14 and 15 are left and right end perspective views, respectively, of the tool of FIG. 12.
Figure 15:
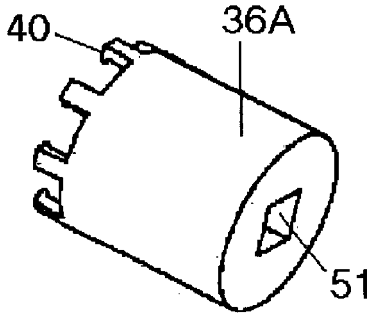

In the alternative embodiment of FIGS. 10 and 11 the radial thickness of each detent finger is varied progressively from the free end of the finger toward the fixed end of the finger at the flat end face 38 to provide controlled bendabilty of the resilient finger. Such variation is achieved by the arcuate recessed configurations of the outer faces of the fingers as seen at 40A in FIG. 10 and at 40B as seen in FIG. 11. In both cases these arcurate recessed surfaces are surfaces of revolution symmetrical with respect to the tool axis. Surface 10A extends to the end face 38 whereas the surface 40B extends beyond the end face 38.

FIGS. 12–15 show an alternative embodiment of the tool of FIG. 2 in the form of a socket 50 utilizing only a single cup or disc retaining cage with a body portion 36A corresponding to one of the end portions 36 of FIG. 2, but having at its other end a cylindrical end portion with a coaxial opening 51, preferably square in cross section, for receiving a conventional socket driving manual tool (not shown).

A convenient length for a double-ended tool 30 is about six inches with each end portion 36 being about one inch long. For two popular sizes of cups the diameters of the tool end portions 36 are about 0.695 and 0.856 inches respectively. The axial length of the stubby resilient fingers 40 may be about 0.100 to 0.150 inches and the radial thickness of their flexible resilient portions is a small fraction of their length. The thickness of the webs 34 of the tool body is about one eighth inch and is kept at a minimum consistent with tool strength to minimize the tool's weight and amount of material required for making the tool.

The tool can be readily molded using a two-piece die with additional removable end plugs complimentary to the shape and undercuts of the sides and inner surfaces of the fingers 40.

Although the several illustrated embodiments contemplate that the tool be made of a moldable resilient tough and lightweight plastic material such as Delrin, it is recognized that it is also possible to make the tool from a machinable material as long as the inherent resilient properties of the teeth or fingers 40 are preserved.

Other variations within the scope of this invention will be apparent from the described embodiment and it is intended that the present descriptions be illustrative of the inventive features encompassed by the appended claims.

We claim:

1. A tool for grasping and rotating a spring-retaining annular disc relative to a disc-retaining pin in a brake shoe assembly, said tool comprising a body portion having an axis of rotation for rotating the disc, said tool having means defining a central coaxial passage of sufficient axial length to accommodate the disc-retaining pin of said brake shoe assembly during said grasping and rotating of the spring-retaining annular disc, said body having coplanar surface portions angularly spaced around said axis for engaging a disc during said grasping and rotating of the spring-retaining annular disc, said body having several axially extending transversely confining elements which together with said body surface portions form a cage for retaining a disc when separate from the brake shoe assembly, and means for allowing portions of said confining elements to be resiliently displaceable relative to said axis to enable a disc to be releasably admitted and confined in the cage by relative movement of the tool with respect to the disc along said axis.

2. A tool according to claim 1 wherein said confining elements are transversely flexible fingers integrally formed with said body portion.

3. A tool according to claim 2 wherein said fingers and said body portion are integrally molded.

4. A tool according to claim 3 wherein said fingers have detent portions at their inwardly facing sides to releasably retain a disc in the cage.

5. A tool according to claim 1 wherein the tool is elongated with a disc retaining cage at each end of the tool.

6. A tool according to claim 5 wherein the cup retaining cages both fit one size disc.

7. A tool according to claim 1 wherein the tool is made of a tough resilient plastic.

8. A tool for engaging and grasping an annular peripheral edge of a coil-spring retaining cup in a drum brake shoe holding cup and pin assembly, said tool having a body portion with at least three fingers extending from the body portion generally parallel to an axis of the tool to be oriented perpendicular to a plane of an annular cup edge and aligned with the center of such a cup, said tool being manually moveable axially relative to the cup with the fingers providing means configured and arranged to be manually pushed past the cup edge at points spaced circumferentially around the cup edge whereby the tool provides a retaining cage for axially and transversely retaining such a cup when the cup is separate from the brake assembly, and said tool including means for frictionally engaging a cup when the cup is in the cage to enable the cup to be rotated when the tool is manually pushed axially and manually rotated about said axis and enable the cup to be positioned for detachment or attachment relative to the pin of the cup and pin assembly, at least a circumferentially spaced plurality of said fingers being resilient and having portions projecting toward said axis to provide displaceable detent means engagable with the cup edge and displaceable relative to said axis by manually moving the tool axially to move the detent means over the cup edge for allowing the tool to positively hold the cup in said cage during manipulation of the tool for detachment and attachment of the cup relative to the pin and to retain the cup in said cage when the cup is separated from the pin.

9. A tool according to claim 8 wherein said tool body is configured to have multiple sets of fingers to form cup grasping and retaining cages for multiple cups.

10. A tool according to claim 8 wherein said tool body is elongated and has a similar set of fingers at opposite ends of the body to form cup grasping and retaining cages for two separate cups.

11. A tool according to claim 10 wherein said cages are of the same size for like-sized cups.

12. A tool according to claim 8 wherein the length of the fingers is such as to provide a depth of said cage to prevent a cup retained therein from significantly tilting therein.

13. A tool according to claim 8 wherein said means for frictionally engaging the cup when the cup is in the cage includes a an annular surface encircling said axis and extending transversely of said axis.

14. A tool according to claim 8 in the form of a socket having an opening for receiving a socket driver.

15. A tool for grasping and rotating a relatively flat annular member relative to an elongated member on which said annular member may be coaxially supported, said tool comprising a body portion having an axis of rotation for rotating the annular member, said tool having means defining a central coaxial passage of sufficient axial length to accommodate the elongated member during said grasping and rotating of the annular member relative to the elongated member, said body having coplanar axially facing surface portions angularly spaced around said passage for engaging said annular member during said grasping and rotating of the annular member, said body having means formed by several axially extending transversely confining elements which together with said axially facing body surface portions form a cage for axially and transversely retaining the annular member when separate from the elongated member, means for allowing portions of said confining elements to be resiliently displaceable relative to said axis to enable an annular member to be releasably admitted and confined in the cage by relative movement of the tool and the annular member along said axis.

16. A tool according to claim 15 wherein said body has such a cage at each end thereof formed by respective sets of axially facing angularly spaced surface portions and several axially extending transversely confining elements.

17. A tool according to claim 16 wherein said cages are of the same size for like-sized annular members.

18. A tool according to claim 15 wherein said tool is made of a strong plastic material enabling said axially extending transversely confining elements to be resilient.

19. A tool according to claim 15 wherein said tool body is configured to have multiple sets of transversely confining elements forming together with respective sets of axially facing body surface portions multiple cages for retaining respective separate annular members, said body having a respective axis of rotation associated with each cage.

20. A tool according to claim 15 in the form of a socket having an opening at an end opposite said cage for receiving a socket driver.

* * * * *